United States Patent
Miller, Jr. et al.

[15] 3,692,184
[45] Sept. 19, 1972

[54] FILTER CARTRIDGE AND PACK THEREFOR AND METHOD OF MAKING SAME

[72] Inventors: Robert B. Miller, Jr., Jerry E. Stephenson, both of Lebanon, Ind. 46052

[73] Assignee: The Carborundum Company, Niagara Falls, N.Y.

[22] Filed: Oct. 7, 1970

[21] Appl. No.: 79,165

[52] U.S. Cl. ..................210/437, 55/498, 210/484, 210/493
[51] Int. Cl. .............................................B01d 27/00
[58] Field of Search..............210/437, 484, 487, 493

[56] References Cited

UNITED STATES PATENTS

| | | |
|---|---|---|
| 3,189,179 | 6/1965 | McMichael............210/493 X |
| 3,246,765 | 4/1966 | Murphy et al. ........210/493 X |
| 2,749,265 | 6/1956 | Fricke et al............210/493 X |
| 3,392,843 | 7/1968 | Mumby..................210/493 X |
| 2,919,807 | 1/1960 | Briggs....................210/493 X |
| 3,520,417 | 7/1970 | Durr et al. ................210/493 |

Primary Examiner—Reuben Friedman
Assistant Examiner—R. W. Burks
Attorney—K. W. Brownell

[57] ABSTRACT

An annular filter pack of longitudinally folded filter paper has a plurality of longitudinally spaced bands of adhesive resin disposed around the inside periphery so as to accurately position the inside folds and dimensionally stabilize the filter pack. The filter pack is incorporated into filter cartridges which may be used to filter a variety of fluids.

9 Claims, 3 Drawing Figures

PATENTED SEP 19 1972　　3,692,184

INVENTORS
ROBERT E. MILLER, JR.
JERRY E. STEPHENSON
BY
R.W. Brownell

FILTER CARTRIDGE AND PACK THEREFOR AND METHOD OF MAKING SAME

BACKGROUND OF THE INVENTION

Filter cartridges employing pleated filter packs are extensively used to filter dry cleaning solvents, oils and other fluids.

In a pleated filter pack, there is a tendency for the pleats to gather under operating conditions. For example in filtering a dry cleaning fluid such as perchloroethylene pressure differences up to 50 psi are typically employed across the filter media. It has been found in examining expended filter cartridges that the stretches of filter paper between the pleats are often clean while contaminants are accumulated around the outside folds. The area available for filtering can be reduced by this condition to such an extent that the folds are the only effective surface areas available for filtering.

In efforts to overcome these problems, filter cartridges of the prior art have concentrated on spacing the outside folds by utilizing adhesive bands around the outside periphery, spaced projections on the inside surface of an outer shell, pleated spacers between the outer folds and the outer shell, or other methods. Heretofore, dimensional stability of the filter pack by accurate positioning of the inside folds has not been effectively achieved.

SUMMARY OF THE INVENTION

It is an object of the present invention to provide a new and improved filter pack which orientates the inside folds so that the area available for filtering is effectively maintained during filtering operations.

It is a further object of the present invention to provide a dimensionally stable filter pack by accurate positioning of the inside folds.

It is a further object of the present invention to provide a method for manufacturing an annular filter pack wherein the inside folds are accurately positioned at an early stage in the manufacture so that uniformity of product is achieved.

Other and further objects of the present invention will become apparent from the following description.

In accordance with the present invention, there is provided an annular filter pack comprising longitudinally folded filter paper having alternate inner and outer folds and a plurality of longitudinally spaced bands comprising an adhesive heat cured resin disposed around the inside periphery so as to dimensionally stabilize the annular filter pack.

Also, in accordance with the present invention, there is provided a filter cartridge incorporating the above-described filter pack, and a method for manufacturing the filter pack.

Figure 1:
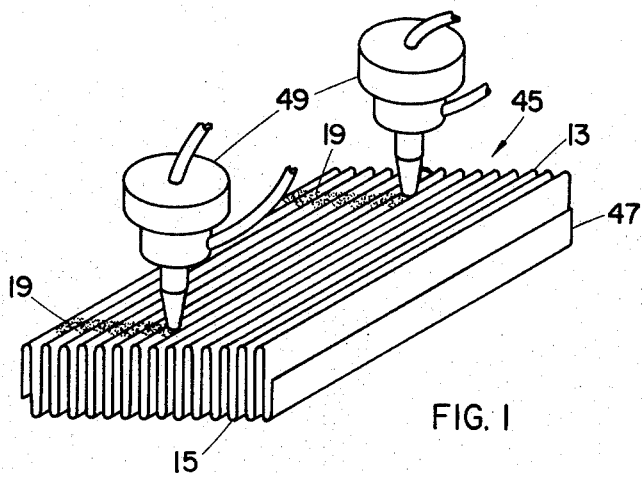
FIG. 1 is a perspective view showing nozzles applying adhesive to a compressed to size filter pack.

As illustrated in the drawings, the filter pack 11 of the present invention is an annulus of longitudinally folded filter paper having inside folds 13 and outside folds 15. The filter paper is arranged so that one set of folds lies in a surface defining an inner periphery and the other set defines an outer periphery of the annular filter pack 11. The stretches 17 between the folds extend substantially radially of the pack 11. The filter pack 11 is adapted to remove contaminants such as dirt, lint, and other particulate from a fluid. For purposes of illustration, the filter pack is described in connection with the filter cartridge, shown in FIG. 3, which in turn is ideally utilized in conventional dry cleaning equipment.

In accordance with the principles of the present invention, a plurality of adhesive bands 19 are circumferentially disposed around and longitudinally spaced along the inside periphery. The inside bands accurately orientate and stabilize the inside folds 13 into a fixed position that is maintained during filtering operations so as to utilize the maximum filter area and permit an even flow of filtrate into the annulus. A plurality of outside bands 21 are circumferentially disposed and longitudinally spaced along the outside periphery to maintain proper orientation of the outside folds 15. The inside bands 19 and outside bands 21 are substantially disposed between the inside folds 13 and outside folds 15.

Figure 2:
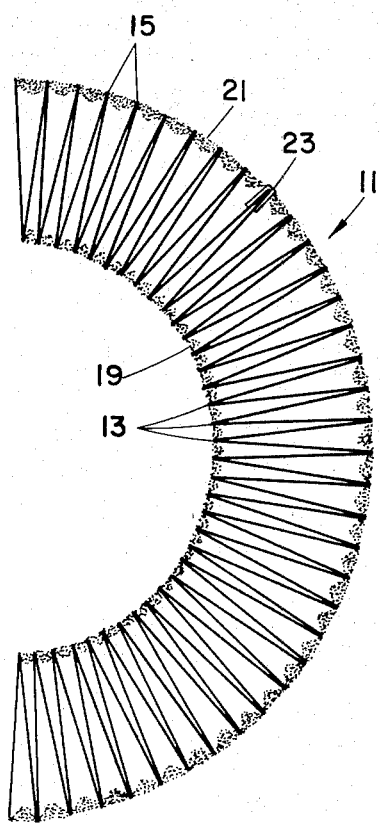
FIG. 2 is a top view of one half a filter element of the present invention.

In the preferred embodiment illustrated in FIG. 2, the free ends of the filter paper are held together by a clip 23 which is formed from a metal strip about one-quarter inch wide bent widthwise into a V-shape. The clip 23 includes a plurality of inwardly facing teeth or projections on the inside portions which engage the free ends of the filter paper when the strip is squeezed together. The clip 23 extends substantially the length of the filter pack 11 thereby sealing and preventing leakage of contaminated solvent.

A resin is utilized for maintaining pleat orientation and imparting structural strength to the annular filter pack 11. The resin is a thermoplastic adhesive resin such as polyvinyl chloride or a variety of other resins. Immersion of the cured plastisol in solvents such as perchloroethylene, gasoline, diesel fuel, hydraulic oil and water, neither affects the adhesion and seal of plastisol nor extracts gums, varnishes or adhesive therefrom.

Figure 3:
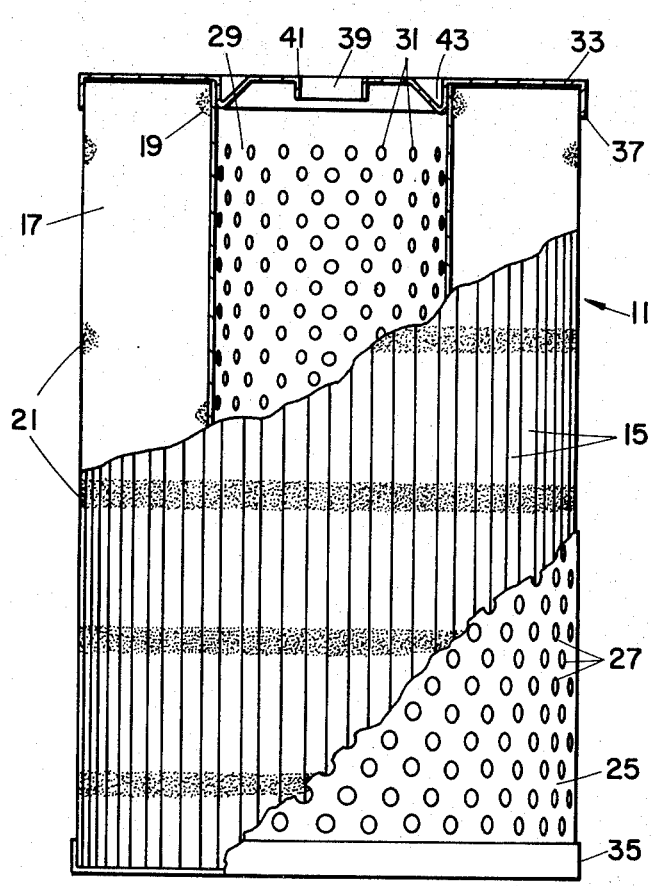
FIG. 3 is a side view in section of a filter cartridge of the present invention.

In the embodiment of the present invention illustrated in FIG. 3, the annular filter pack 11 is assembled with other components to provide a completed filter cartridge. An outer shell 25 which has a plurality of apertures 27 over its entire surface is cylindrical with smooth outside and inside surfaces. The outer shell 25 completely covers the outer peripheral surface of the filter element with the inside surface of the shell and engages the outside folds 15. The shell 25 can be formed of a resistant paper which has a threaded seam or metal which has a welded seam. It is not necessary for the shell 25 to structurally support the paper pack 11 since the plastisol bands serve this purpose. The primary purpose of the shell is to protect the pleats from damage such as may be caused by handling the cartridge.

A cylindrical support tube 29 which has a plurality of apertures 31 engages the inner folds 13. The support tube 29 is preferably formed from a metal sheet which has the ends lock seamed or welded together to form a cylinder. The contaminated fluid is pumped through the paper pack 11 and through the apertures 31 in the support tube.

End plates 33 and 35 are each identical in shape. Each are circular with an outer flange 37 which fits snugly over the outer shell 25 thereby holding it against the filter pack 11. An inner cylindrical skirt or depressed surface 43 is dimensioned to seal with a tight friction fit the inside wall of the support tube 29. Each plate 33 and 35 has a central opening 39 for the withdrawal of filtrate. The opening 39 has an inwardly projecting flange 41 around its periphery. Preferably each end plate 33 and 35 is of one piece metal construction.

In the manufacture of the annular filter pack of the present invention, a rectangular sheet of resin impregnated longitudinally corrugated filter paper is folded across the corrugations to extend back and forth upon itself in a zig-zag formation. The stretches 17 between folds are substantially the same width. With the filter pack laying flat, one set of folds describes a plane and the other set describes another plane substantially parallel to the first plane. The folded paper pack 45 is compressed and held in a frame 47 to a length which corresponds to the desired circumference of the support tube 29. The folds or pleats position themselves in the frame 47 evenly due to the resilience of the folded paper. The controlled spacing is maintained by laying the inside bands 19 down on the compressed to size paper pack with nozzles 49. Each nozzle has a feed line for a plastisol which is squirted onto the filter pack by the action of a piston operating pneumatically by air supplied through a second line. The strips of plastisol flow down between the pleats so that only a small amount, if any, remains above the folds. The inside bands 19 are precured at the proper temperature by passing the flat filter pack through an infrared or other heater. The flat pack is formed into an annulus and side sealed in a machine suited for this purpose. With the inside folds in place, the outside folds fan out thereby properly orientating themselves.

The filter cartridge illustrated in FIG. 3 is made by inserting the support tube 29 into the annular filter pack 11. The filter pack 11 is then rotated under a plurality of spaced nozzles issuing streams of adhesive resin so that each band encircles the outer periphery of the annulus. The outer shell 25 is installed over the outside folds 15 and the end plates 33 and 35 are frictionally fitted and sealed in their respective ends with a film of plastisol. The entire assembly is then finally cured.

As illustrative of another type of filter cartridge that may be assembled, a center tube may be fitted around flanges 41 between openings 39 in each end plate 33 to form a conditioning chamber. This cartridge is made by starting with annular filter pack 11. Then outside bands are applied and cured; the outer shell and support tube are fitted into place, and one end plate is sealed with a film of adhesive resin to one end of the partially assembled cartridge. A center tube including a wrapping of plastic cloth is fitted over and sealed to flange 43 with adhesive resin so as to form a solvent conditioning chamber which is filled with carbon. The installed end is then cured on a hot plate. The other end is sealed to a second end plate with plastisol and cured on a hot plate. This procedure is followed in the latter case since the finally assembled filter cartridge cannot be subjected to curing temperatures without running the risk of damaging the plastic cloth on the center tube.

In either of the above methods of manufacturing filter cartridges, given by way of illustration not limitation, the inside folds are accurately positioned and the filter pack is dimensionally stabilized during an early stage of manufacture.

While preferred embodiments of the present invention have been described and illustrated, it is to be recognized that modifications thereof may be made without departing from the spirit and scope of the present invention as described in the appended claims.

What is claimed is:

1. A filter cartridge comprising: a cylindrical support tube having a plurality of apertures; a cylindrical outer shell having a plurality of apertures; an annular filter pack comprising longitudinally folded filter paper having inner and outer folds engaging along the entire length of said support tube and said outer shell, respectively; means for holding the longitudinal ends of said folded filter together; a plurality of first bands of adhesive cured plastisol resin spaced longitudinally and disposed around the inside periphery formed by said inside folds; a plurality of second bands of adhesive heat cured plastisol resin spaced longitudinally and disposed around the outside periphery formed by the outside folds, said first and second bands of plastisol being substantially disposed between the inside and outside folds, respectively; and a pair of end plates, each end plate sealably engaging one end of said annular filter pack.

2. A filter cartridge in accordance with claim 1 wherein each end plate includes an outer flange frictionally engaging said outer shell, an inner skirt frictionally engaging said support tube, and a film of heat cured resin sealably engaging said annular filter pack.

3. A filter cartridge comprising: a support tube having a plurality of apertures; an outer shell adapted for the flow of fluid therethrough; an annular filter pack comprising longitudinally folded filter paper having inner and outer folds engaging along the entire length of said support tube and said outer shell, respectively, a plurality of bands of adhesive heat cured resin spaced longitudinally and disposed around the inside periphery formed by the inside folds; an end plate at each end having a center opening for the passage of fluid sealably engaging said annular filter pack.

4. A filter cartridge in accordance with claim 3 further comprising another plurality of longitudinally spaced bands comprising an adhesive heat cured resin, disposed around the outside periphery of said annular filter pack.

5. A filter cartridge in accordance with claim 4 further comprising a means sealably engaging the free ends of the filter paper.

6. A filter cartridge in accordance with claim 4 wherein each end plate includes an outer flange frictionally engaging said outer shell, an inner skirt frictionally engaging said support tube and a film of heat cured resin sealably engaging said annular filter pack.

7. A method for making an annular filter pack comprising folding a sheet of filter paper back and forth so as to position one set of folds in a first plane and another set of folds in a second plane substantially parallel to the first plane, applying a plurality of spaced bands of adhesive resin across one set of folds, curing said adhesive resin, and forming an annular filter pack with said bands of heat cured resin on the inside periphery.

8. A method in accordance with claim 7, further comprising compacting the folded filter paper to a length corresponding to the desired inside circumference of the annular filter pack prior to applying said bands.

9. A method in accordance with claim 8, wherein said annular filter pack is formed by side sealing the free ends of the filter paper.

* * * * *